US008982805B2

(12) United States Patent
Chen et al.

(10) Patent No.: US 8,982,805 B2
(45) Date of Patent: Mar. 17, 2015

(54) ACTIVATING COMPONENT CARRIERS BY NON-CONTENTION BASED RANDOM ACCESS PROCEDURE

(75) Inventors: Chun-Chia Chen, Zhutang Township, Changhua County (TW); Chun-Yen Wang, Tainan (TW)

(73) Assignee: Acer Incorporated, Taipei Hsien (TW)

( * ) Notice: Subject to any disclaimer, the term of this patent is extended or adjusted under 35 U.S.C. 154(b) by 385 days.

(21) Appl. No.: 13/078,370

(22) Filed: Apr. 1, 2011

(65) Prior Publication Data

US 2011/0249635 A1 Oct. 13, 2011

Related U.S. Application Data

(60) Provisional application No. 61/322,651, filed on Apr. 9, 2010.

(51) Int. Cl.
| H04W 76/06 | (2009.01) |
| H04W 74/08 | (2009.01) |
| H04W 74/00 | (2009.01) |
| H04W 72/04 | (2009.01) |

(52) U.S. Cl.
CPC ........ *H04W 74/0833* (2013.01); *H04W 76/068* (2013.01); *H04W 74/002* (2013.01); *H04W 72/0406* (2013.01)
USPC .......................................................... 370/329

(58) Field of Classification Search
CPC ................................................ H04W 74/0833
USPC ....................................................... 370/329
IPC .................................................. H04W 74/0833
See application file for complete search history.

(56) References Cited

U.S. PATENT DOCUMENTS

| 2007/0293224 A1* | 12/2007 | Wang et al. ................. 455/436 |
| 2008/0310395 A1* | 12/2008 | Kashima ..................... 370/350 |
| 2009/0279495 A1* | 11/2009 | Yoo ............................. 370/329 |

(Continued)

FOREIGN PATENT DOCUMENTS

| WO | WO 2009/046061 | 4/2009 |
| WO | WO 2010/013970 | 2/2010 |

OTHER PUBLICATIONS

European Search Report dated Jan. 13, 2012.

(Continued)

*Primary Examiner* — Benjamin Lamont
(74) *Attorney, Agent, or Firm* — McClure, Qualey & Rodack, LLP

(57) ABSTRACT

A wireless communications device with a wireless module and a controller module is provided. The wireless module performs wireless transceiving to and from a radio access network. The controller module receives a preamble assignment message comprising a component carrier indicator from the radio access network via the wireless module, and transmits, on a component carrier corresponding to the component carrier indicator, a Random Access Preamble (RAP) message to the radio access network via the wireless module. Also, the controller module receives a Random Access Response (RAR) message corresponding to the RAP message from the radio access network via the wireless module, and determines whether to activate the component carrier in response to one of the preamble assignment message, the RAP message, and the RAR message.

30 Claims, 12 Drawing Sheets

(56) References Cited

U.S. PATENT DOCUMENTS

| | | | |
|---|---|---|---|
| 2010/0177747 A1* | 7/2010 | Chun et al. | 370/336 |
| 2010/0232382 A1* | 9/2010 | Gauvreau et al. | 370/329 |
| 2010/0296467 A1* | 11/2010 | Pelletier et al. | 370/329 |
| 2011/0026475 A1* | 2/2011 | Lee et al. | 370/329 |
| 2011/0039593 A1* | 2/2011 | Lee et al. | 455/515 |
| 2011/0045837 A1* | 2/2011 | Kim et al. | 455/452.1 |
| 2011/0134774 A1* | 6/2011 | Pelletier et al. | 370/252 |
| 2011/0159903 A1* | 6/2011 | Yuk et al. | 455/507 |
| 2011/0235609 A1* | 9/2011 | Ahn et al. | 370/329 |
| 2011/0243048 A1* | 10/2011 | Wang et al. | 370/311 |
| 2011/0243106 A1* | 10/2011 | Hsu et al. | 370/336 |
| 2011/0317777 A1* | 12/2011 | Huang et al. | 375/259 |

OTHER PUBLICATIONS

European Search Report dated Sep. 1, 2011.
CATT; "Consideration on RACH in CA;" Apr. 6, 2010; pp. 1-4.
E-Mall Rapporteur; "CA Support for Multi-TA;" Feb. 18, 2010; pp. 1-12.

* cited by examiner

US 8,982,805 B2

ACTIVATING COMPONENT CARRIERS BY NON-CONTENTION BASED RANDOM ACCESS PROCEDURE

CROSS REFERENCE TO RELATED APPLICATIONS

This Application claims the benefit of U.S. Provisional Application No. 61/322,651, filed on Apr. 9, 2010, the entirety of which is incorporated by reference herein.

BACKGROUND OF THE INVENTION

1. Field of the Invention

The invention generally relates to the technique of carrier aggregation, and more particularly, to wireless apparatuses, wireless systems, and methods for managing the activation and deactivation of multiple component carriers.

2. Description of the Related Art

In order to meet users' demand for higher data rate in wireless communications, support of wider transmission bandwidths is required. A so-called Carrier Aggregation (CA) technique has been proposed to allow expansion of effective bandwidth delivered to a user terminal through concurrent utilization of radio resources across multiple carriers. The CA technique is most useful when it is difficult to derive a contiguous and extra wide bandwidth. With the CA technique, more than 2 frequency bands may be aggregated to form a larger transmission/receive bandwidth. Each of the aggregated frequency channels is generally referred to as a Component Carrier (CC), which may be taken as a component of the aggregated bandwidth.

Specifically, a CC needs to be configured and activated before it may be used for data transmission or reception. Taking a Long Term Evolution (LTE) technology as an example, an LTE system may first transmit a Radio Resource Control (RRC) message to configure the CCs for the user terminal, and then activate the CCs by dedicated signaling, such as a Medium Access Control (MAC) Control Element (CE). Later, if a smaller transmission bandwidth is required instead, the LTE system may transmit another MAC CE to the user terminal to deactivate one of the activated CCs. Alternatively, a deactivation timer (or may be referred to as a release timer) may be maintained both in the network side and/or the user terminal to count a predetermined time period when the corresponding activated CCs may stay activated. When the deactivation timer expires, the LTE system and/or the user terminal may deactivate the corresponding CCs. Since the user terminal does not need to monitor the physical downlink shared channel (PDSCH) and physical downlink control channel (PDCCH) corresponding to the deactivated CCs, power consumption of the user terminal may be efficiently reduced.

BRIEF SUMMARY OF THE INVENTION

Accordingly, embodiments of the invention provide apparatuses, systems, and methods for managing multiple component carriers. In one aspect of the invention, a wireless communications device for managing multiple component carriers is provided. The wireless communications device comprises a wireless module and a controller module. The wireless module performs wireless transceiving to and from a radio access network. The controller module receives a preamble assignment message comprising a component carrier indicator from the radio access network via the wireless module, and transmits, on a component carrier corresponding to the component carrier indicator, a Random Access Preamble (RAP) message to the radio access network via the wireless module. Also, the controller module receives a Random Access Response (RAR) message corresponding to the RAP message from the radio access network via the wireless module, and determines whether to activate the component carrier in response to one of the preamble assignment message, the RAP message, and the RAR message.

In another aspect of the invention, a method for managing multiple component carriers in a wireless communications device wirelessly connected to a radio access network is provided. The method comprises the steps of receiving a preamble assignment message comprising a component carrier indicator from the radio access network, transmitting, on a component carrier corresponding to the component carrier indicator, an RAP message to the radio access network, receiving an RAR message corresponding to the RAP message from the radio access network, and determining whether to activate the component carrier in response to one of the preamble assignment message, the RAP message, and the RAR message.

In another aspect of the invention, a radio access network for managing multiple component carriers is provided. The radio access network comprises an access node and a control node. The access node performs wireless transceiving to and from a wireless communications device. The control node transmits a preamble assignment message comprising a component carrier indicator to the wireless communications device via the access node, and receives, on a component carrier corresponding to the component carrier indicator, an RAP message from the wireless communications device via the access node. Also, the control node transmits an RAR message corresponding to the RAP message to the wireless communications device via the access node, and determines whether to activate the component carrier for the wireless communications device in response to one of the preamble assignment message, the RAP message, and the RAR message.

In another aspect of the invention, a method for managing multiple component carriers by a radio access network is provided. The method comprises the steps of transmitting a preamble assignment message comprising a component carrier indicator to a wireless communications device, receiving, on a component carrier corresponding to the component carrier indicator, an RAP message from the wireless communications device, transmitting an RAR message corresponding to the RAP message to the wireless communications device, and determining whether to activate the component carrier for the wireless communications device in response to one of the preamble assignment message, the RAP message, and the RAR message.

In another aspect of the invention, another wireless communications device for managing multiple component carriers is provided. The wireless communications device comprises a wireless module and a controller module. The wireless module performs wireless transceiving to and from a radio access network. The controller module transmits, on a component carrier, an RAP message to the radio access network via the wireless module, and receives an RAR message corresponding to the RAP message from the radio access network via the wireless module. Also, the controller module performs a scheduled transmission indicating a User Equipment Identification (UE ID) or Cell-Radio network Temporary Identifier (C-RNTI) to the radio access network via the wireless module in response to the RAR message, receives a contention resolution message corresponding to the scheduled transmission from the radio access network via the wireless module, and determines whether to start or restart counting an activation time period for the component carrier according to the contention resolution message.

In another aspect of the invention, a method for managing multiple component carriers in a wireless communications device wirelessly connected to a radio access network is provided. The method comprises the steps of transmitting, on a component carrier, an RAP message to the radio access network, receiving an RAR message corresponding to the RAP message from the radio access network, performing a scheduled transmission indicating a UE ID or C-RNTI to the radio access network in response to the RAR message, receiving a contention resolution message corresponding to the scheduled transmission from the radio access network, and determining whether to start or restart counting an activation time period for the component carrier according to the contention resolution message.

In another aspect of the invention, another radio access network for managing multiple component carriers is provided. The radio access network comprises an access node and a control node. The access node performs wireless transceiving to and from a wireless communications device. The control node receives, on a component carrier, an RAP message from the wireless communications device via the access node, and transmits an RAR message to the wireless communications device via the access node in response to the RAP message. Also, the control node receives a scheduled transmission indicating a UE ID or C-RNTI from the wireless communications device via the access node, transmits a contention resolution message corresponding to the scheduled transmission to the wireless communications device via the access node, and determines whether to start or restart counting an activation time period for the component carrier according to the contention resolution message.

In another aspect of the invention, a method for managing multiple component carriers by a radio access network is provided. The method comprises the steps of receiving, on a component carrier, an RAP message from a wireless communications device, transmitting an RAR message to the wireless communications device in response to the RAP message, receiving a scheduled transmission indicating a UE ID or C-RNTI from the wireless communications device, transmitting a contention resolution message corresponding to the scheduled transmission to the wireless communications device, transmitting a contention resolution message corresponding to the scheduled transmission to the wireless communications device, and determining whether to start or restart counting an activation time period for the component carrier according to the contention resolution message.

Other aspects and features of the invention will become apparent to those with ordinary skill in the art upon review of the following descriptions of specific embodiments of the wireless communications devices, the radio access networks, and the methods for managing multiple component carriers.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The 3GPP specifications are used to teach the spirit of the invention, and the invention is not limited thereto.

Figure 1:
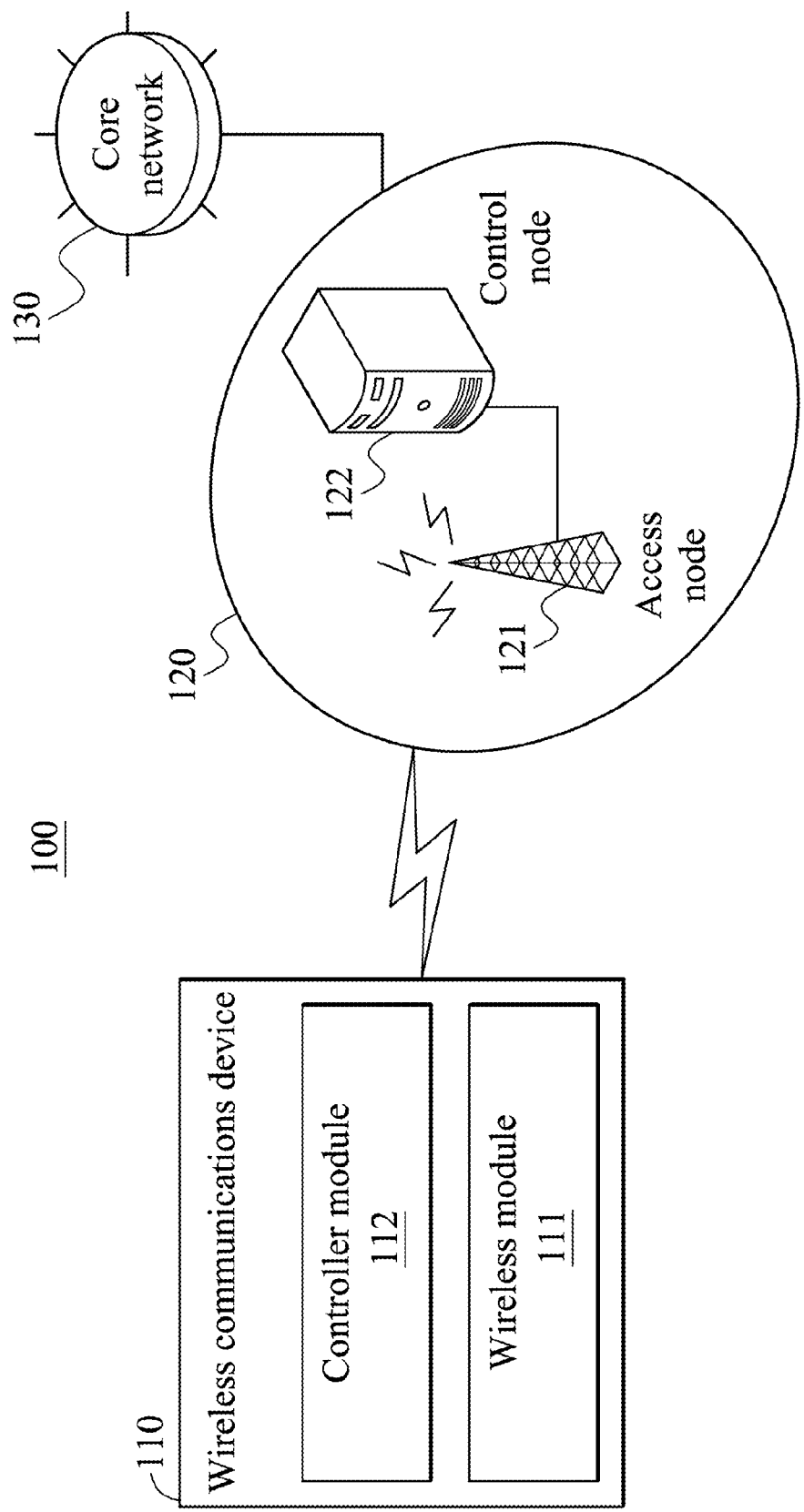
FIG. 1 is a block diagram illustrating a wireless communications environment according to an embodiment of the invention.

The invention proposes to activate CC(s) using non-contention based and contention based random access procedures. FIG. 1 is a block diagram illustrating a wireless communications environment according to an embodiment of the invention. In the wireless communications environment 100, the wireless communications device 110 is wirelessly connected to the radio access network 120 for obtaining wireless services. The radio access network 120 comprises at least one access node 121 and a control node 122, wherein the access node 121 is generally referred to as a cellular station, a base station, or an access station, or may be referred to as a Node-B (NB) in a WCDMA network or an evolved-NB (eNB) in an LTE network, which is controlled by the control node 122 to provide the functionality of wireless transceiving for the radio access network 120. The radio access network 120 may further be connected to a core network 130 for interfacing to external networks, such as the Public Switched Telephone Network (PSTN), which is called the Circuit Switched (CS) domain, and interfacing to the Internet Protocol (IP) based Network, such as the Internet, which is called the Packet Switched (PS) domain. Typically, the cooperation of the radio access network 120 and the core network 130 contributes to a so-called service network. The mobile communication device 110 comprises a wireless module 111 for performing the functionality of wireless transceiving to and from the radio access network 120. To further clarify, the wireless module 111 may comprise a baseband unit (not shown) and a radio frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communications system, wherein the radio frequency may be 900 MHz, 1900 MHz, or 2100 MHz utilized in WCDMA systems, or may be 900 MHz, 2100 MHz, or 2.6 GHz utilized in LTE systems, or others depending on the radio access technology (RAT) in use. Also, the mobile communication device 110 comprises a controller module 112 for controlling the operation of the wireless module 111 and other functional components, such as a display unit and/or keypad serving as the MMI (man-machine interface), a storage unit storing the program codes of applications or communication protocols, or others. In one embodiment, the radio access network 120 may be an Evolved-UMTS (Universal Mobile Telecommunications System) Terrestrial Radio Access Network (E-UTRAN) of an LTE network and the wireless communications device 110 may be a User Equipment (UE) in compliance with release 9 of the 3GPP TS 36.331 and 36.321 specifications (referred to herein as the 36.331 and 36.321 specifications), and release 10 of the 3GPP TS 36.300 specification (referred to herein as the 36.100 specification), and/or other related specifications of the LTE technology.

Figure 2:
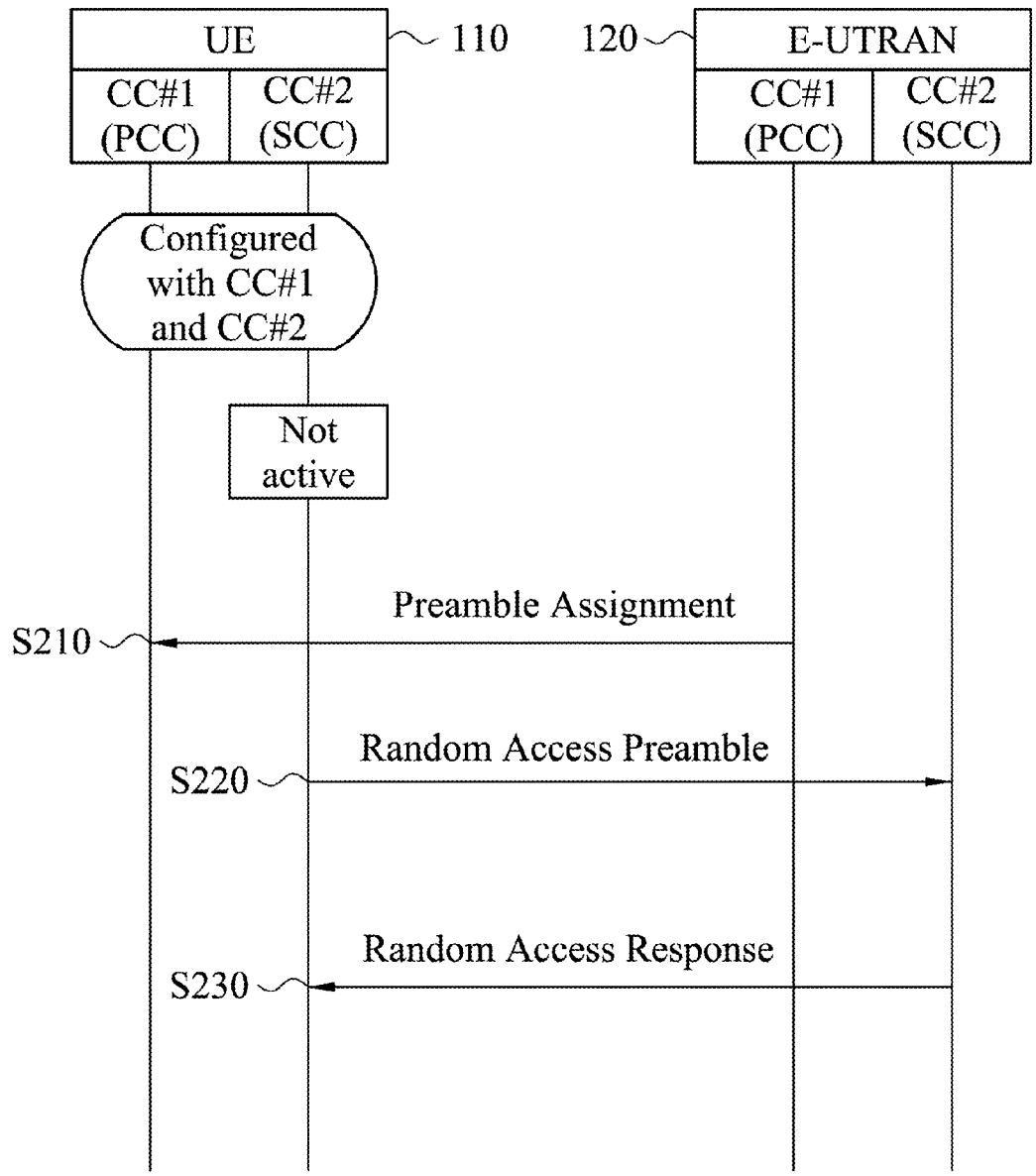
FIG. 2 is a message sequence chart illustrating a non-contention based random access procedure according to an embodiment of the invention.

To be more specific, the controller module 112 controls the wireless module 111 for performing non-contention based and contention based random access procedures with the radio access network 120 to activate the configured but inactive CC(s). FIG. 2 is a message sequence chart illustrating a non-contention based random access procedure according to an embodiment of the invention. In this embodiment, the radio access network 120 is an E-UTRAN and the wireless communications device 110 is a UE. Initially, a first CC (referred to herein as CC#1) and a second CC (referred to herein as CC#2) are already configured for the wireless communications device 110, wherein CC#1 is configured as a primary CC (denoted as PCC) and CC#2 is configured as a secondary CC (denoted as SCC). The radio access network 120 may transmit an RRC message, such as an RRC Connection Reconfiguration message, to the wireless communications device 110 to configure CC#1 and CC#2. Note that CC#1 is already active since it has been configured as a primary CC, while CC#2 is initially inactive. In order to activate CC#2, the radio access network 120 first transmits a preamble assignment message to the wireless communications device 110 (step S210). Specifically, the preamble assignment message includes not only an assigned preamble but also a CC indicator, such as a Carrier Indicator Field (CIF), for indicating the target CC to be activated, i.e. CC#2. When receiving the preamble assignment message, the controller module 112 transmits, on CC#2, a Random Access Preamble (RAP) message to the radio access network 120 via the wireless module 111 (step S220), wherein the RAP message is transmitted using the assigned preamble. Next, the radio access network 120 replies with, on CC#2, a Random Access Response (RAR) message to acknowledge the receipt of the RAP message to the wireless communications device 110 upon receiving the RAP message (step S230). When the wireless communications device 110 receives the RAR message, the non-contention based random access procedure is completed and CC#2 is successfully activated. Specifically, for the wireless communications device 110, CC#2 may be considered as activated prior to the reception of the RAR message. In one embodiment, the controller module 112 may consider CC#2 as being activated when the preamble assignment message is received. In another embodiment, the controller module 112 may consider CC#2 as being activated when the RAP message is transmitted. In yet another embodiment, the controller module 112 may consider CC#2 as being activated after a predetermined time period subsequent to the time when the RAR message is received, because a certain extra amount of time may be required to process the RAR message. After CC#2 is activated, the wireless communications device 110 may receive data and control signal via the PDSCH and PDCCH on CC#2, respectively, and may perform Channel Quality Indicator (CQI) measurements. In addition to the activation of CC#2, the non-contention based random access procedure also provides the radio access network 120 a way for adjusting the timing of the wireless communications in the uplink direction between the wireless communications device 110 and the radio access network 120. That is, the radio access network 120 may determine the timing offset according to the RAP message, and then adjust the timing of the wireless communications in the uplink direction using the timing offset.

Note that the RAR message may be transmitted on any activated CC, which may be different from the CCs on which the corresponding RAP messages are transmitted, and may comprise acknowledgement information for multiple RAP messages from multiple wireless communications devices. In another embodiment, the RAR message may be transmitted on CC#1 or any other CC that has already been activated. However, there may be more than one wireless communications device assigned with the same preamble on different CCs but receiving an RAR message for this preamble on the same CC, e.g. a first wireless communications device is assigned with preamble-1 and transmits the RAP message with preamble-1 on CC#2 while a second wireless communications device is assigned with preamble-1 and transmits the RAP message with preamble-1 on CC#1. And later, both of the first wireless communications device and the second wireless communications device receive an RAR message for preamble-1 on CC#1. As a result, more than one wireless communications device transmitting an RAP message using preamble-1 may cause ambiguity in the acknowledgement information in the RAR message. That is, each of the wireless communications devices using preamble-1 may take the RAR message as an acknowledgement for the RAP message it just transmitted, while the acknowledgement information in the RAR message is only meant for the RAP message transmitted using preamble-1 on CC#2. In order to solve the ambiguity problem, the radio access network 120 may not assign the same preamble which is assigned to a first wireless communications device to a second wireless communications device when the first wireless communications device and the second wireless communications device have the same at least one configured and/or activated CC, so that the preamble used for transmitting the RAP message and for acknowledging the RAP message in the RAR message is unique. Another solution for the ambiguity problem may be that the radio access network 120 may scramble the RAR message using the User Equipment Identification (UE ID) or Cell-Radio network Temporary Identifier (C-RNTI) of the wireless communications device 110. Specifically, by scrambling the RAR message using the UE ID or C-RNTI, the invention proposes to scramble the Cyclic Redundant Check (CRC) of the Downlink Control Information (DCI) format for the RAR message. Since the UE ID or C-RNTI may be used to uniquely identity a wireless communications device, the acknowledgement information in the RAR message may be unambiguously taken by the wireless communications devices. That is, it may be determined that the acknowledgement information in the RAR message is for the wireless communications device 110 only when the RAR message may be successfully de-scrambled using the UE ID or C-RNTI of the wireless communications device 110. Otherwise, if the wireless communications device 110 fails to de-scramble the RAR message using its UE ID or C-RNTI, it may be determined that the acknowledgement information in the RAR message is not for the wireless communications device 110.

Figure 3:
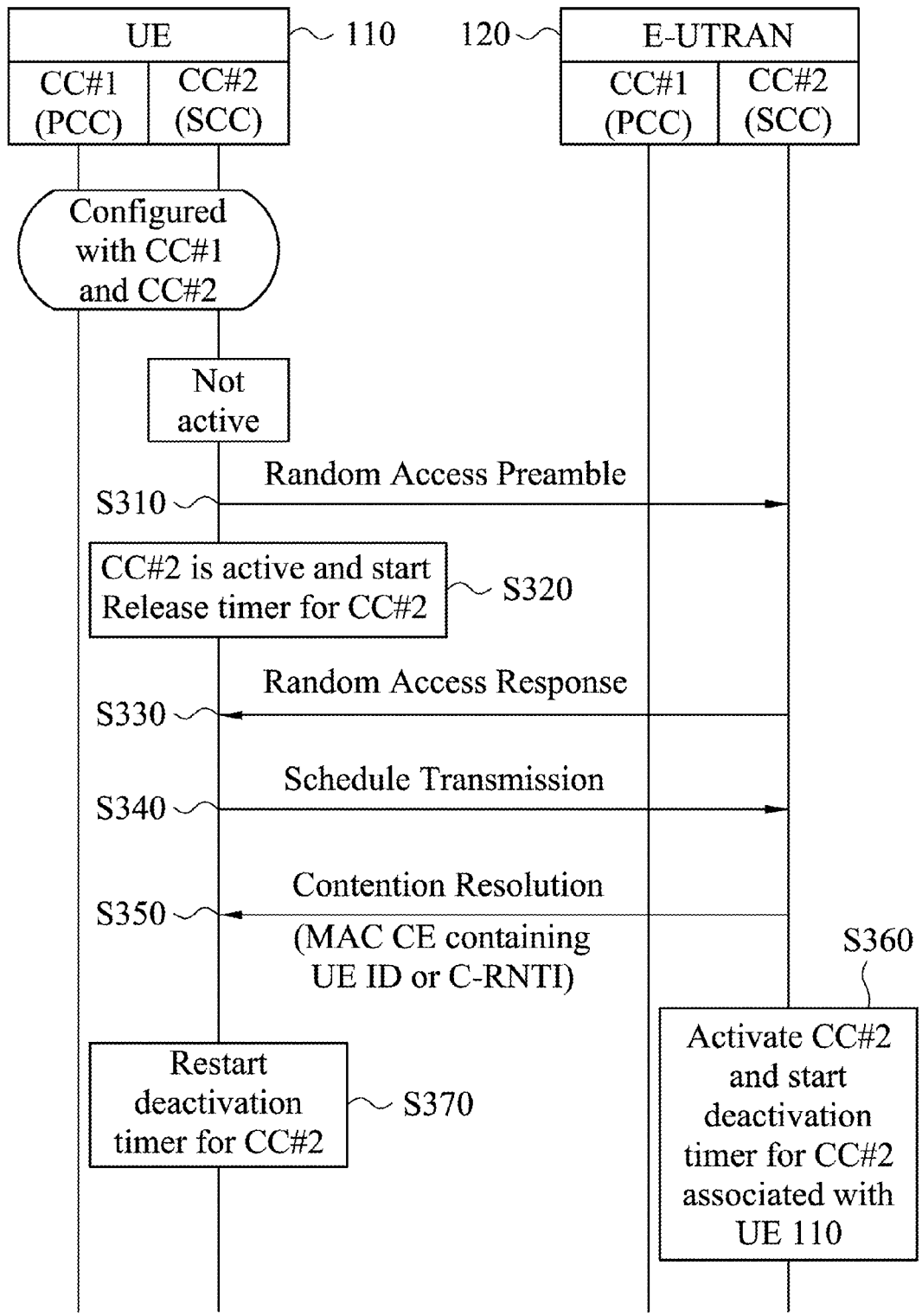
FIG. 3 is a message sequence chart illustrating a contention based random access procedure according to an embodiment of the invention.

FIG. 3 is a message sequence chart illustrating a contention based random access procedure according to an embodiment of the invention. Similar to FIG. 2, the radio access network 120 is an E-UTRAN and the wireless communications device 110 is a UE. Initially, CC#1 and CC#2 are already configured for the wireless communications device 110, wherein CC#1 is configured as a primary CC and CC#2 is configured as a secondary CC. Note that CC#1 is already active since it has been configured as a primary CC, while CC#2 is initially inactive. In order to activate CC#2, the wireless communications device 110 transmits an RAP message to the radio access network 120 on CC#2 (step S310), wherein the RAP message is transmitted using a preamble selected from a preamble pool broadcasted by the radio access network 120. Note that, upon transmission of the RAP message, the wireless communications device 110 may consider CC#2 as being activated and start a deactivation timer for counting the activation time period for CC#2 (step S320). When receiving the RAP message, the radio access network 120 replies with, on CC#2, an RAR message to acknowledge the receipt of the RAP message to the wireless communications device 110 (step S330). However, since the preamble pool is known to all wireless communications devices in the coverage of the radio access network 120, there may be a situation where multiple wireless communications devices select the same preamble to transmit the RAP messages to the radio access network 120. Thus, the wireless communications device 110 further performs a scheduled transmission on CC#2 indicating its UE ID or C-RNTI to the radio access network 120 (step S340). When receiving the scheduled transmission from the wireless communications device 110, the radio access network 120 replies with, on CC#2, a contention resolution message to the wireless communications device 110 (step S350), wherein the contention resolution message is a MAC CE containing the UE ID or C-RNTI of the wireless communications device 110. In another embodiment, the contention resolution message may be transmitted on any other CC that has already been activated. Upon transmission of the contention resolution message, the radio access network 120 activates CC#2 and starts a deactivation timer for counting the activation time period for CC#2 (step S360). Next, when receiving the contention resolution message, the wireless communications device 110 restarts the deactivation timer according to the contention resolution message (step S370). Specifically, the deactivation timer is restarted in response to the MAC CE containing the UE ID or C-RNTI of the wireless communications device 110. That is, it is determined that the contention resolution message received in step S350 is for the wireless communications device 110 if the MAC CE contains the UE ID or C-RNTI of the wireless communications device 110, and the contention based random access procedure is completed. Meanwhile, the radio access network 120 also starts a deactivation timer for CC#2 after transmitting the contention resolution message, so the activation time period for CC#2 may be synchronized accordingly. In another embodiment, the wireless communications device 110 and the radio access network 120 may start or restart the deactivation timer for a predetermined time period, for the wireless communications device 110 to process the contention resolution message. Alternatively, the deactivation timer may not be started upon transmission of the RAP message and later be started when the MAC CE is received and the MAC CE contains the UE ID or C-RNTI of the wireless communications device 110.

Figure 4:
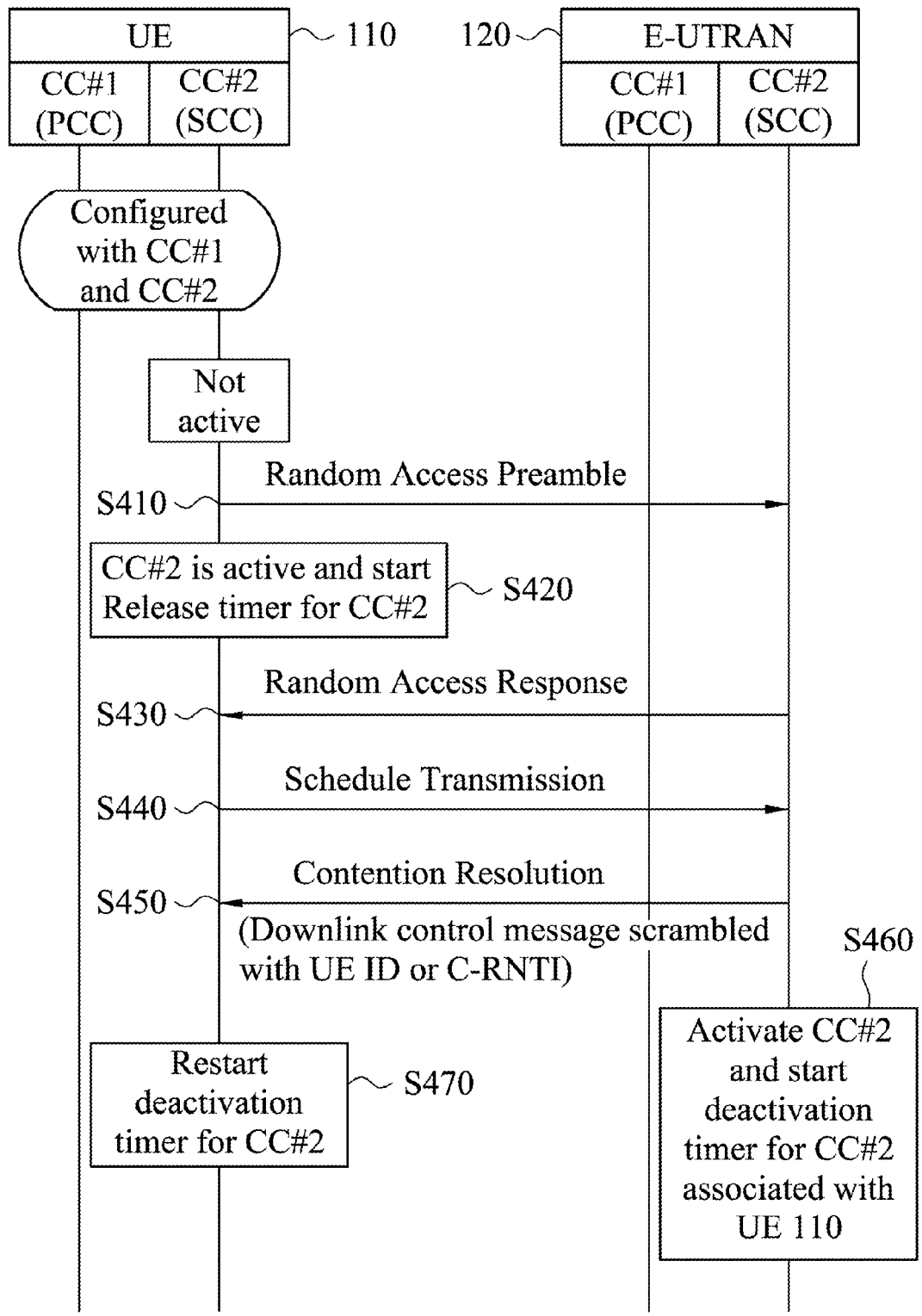
FIG. 4 is a message sequence chart illustrating a contention based random access procedure according to another embodiment of the invention.

FIG. 4 is a message sequence chart illustrating a contention based random access procedure according to another embodiment of the invention. Similar to FIG. 3, the radio access network 120 is an E-UTRAN and the wireless communications device 110 is a UE. Initially, CC#1 and CC#2 are already configured for the wireless communications device 110, wherein CC#1 is configured as a primary CC and CC#2 is configured as a secondary CC. Note that CC#1 is already active since it has been configured as a primary CC, while CC#2 is initially inactive. In order to activate CC#2, the wireless communications device 110 transmits an RAP message to the radio access network 120 on CC#2 (step S410), wherein the RAP message is transmitted using a preamble selected from a preamble pool broadcasted by the radio access network 120. Note that, upon transmission of the RAP message, the wireless communications device 110 may consider CC#2 as being activated and start a deactivation timer for counting the activation time period for CC#2 (step S420). When receiving the RAP message, the radio access network 120 replies with, on CC#2, an RAR message to acknowledge the receipt of the RAP message to the wireless communications device 110 (step S430). However, since the preamble pool is known to all wireless communications devices in the coverage of the radio access network 120, there may be a situation where multiple wireless communications devices select the same preamble to transmit the RAP messages to the radio access network 120. Thus, the wireless communications device 110 further performs a scheduled transmission on CC#2 indicating its UE ID or C-RNTI to the radio access network 120 (step S440). When receiving the scheduled transmission from the wireless communications device 110, the radio access network 120 replies with, on CC#2, a contention resolution message to the wireless communications device 110 (step S450), wherein the contention resolution message is a downlink control message transmitted via PDCCH and scrambled with the UE ID or C-RNTI of the wireless communications device 110. Note that, the radio access network 120 may assign downlink resource blocks on CC#2 via this downlink control message, so that the wireless communications device 110 may be able to receive the downlink data. In another embodiment, the contention resolution message may be the downlink control message which contains a CC#2 indicator and is transmitted on any activated CC other than CC#2, and the downlink resource blocks on the corresponding CC is assigned to the wireless communications device 110 via this downlink control message. Specifically, the downlink resource blocks on the corresponding CC may be indicated by a CC indicator, such as a CIF. Upon transmission of the downlink control message, the radio access network 120 activates CC#2 and starts a deactivation timer for counting the activation time period for CC#2 (step S460). Next, when receiving the downlink control message, the wireless communications device 110 restarts the deactivation timer according to the contention resolution message to synchronize the activation time period for CC#2 with the radio access network 120 (step S470). Specifically, the deactivation timer is restarted in response to the downlink control message being successfully de-scrambled with the UE ID or C-RNTI of the wireless communications device 110, or the downlink control message containing the CC#2 indicator. That is, it is determined that the contention resolution message received in step S450 is for the wireless communications device 110 if the wireless communications device 110 successfully de-scrambles the downlink control signaling using its UE ID or C-RNTI or successfully decodes the control signaling which contains this CC indicator and is transmitted on the other activated CC, and the contention based random access procedure is completed. In another embodiment, the wireless communications device 110 and the radio access network 120 may start or restart the deactivation timer for a predetermined time period, for the wireless communications device 110 to process the contention resolution message. Likewise, the radio access network 120 may postpone the start of the deactivation timer for the predetermined time period. Alternatively, the deactivation timer may not be started upon transmission of the RAP message and later be started when the downlink control message scrambled with the UE ID or C-RNTI, or containing this CC indicator of the wireless communications device 110 is received.

Figure 5:
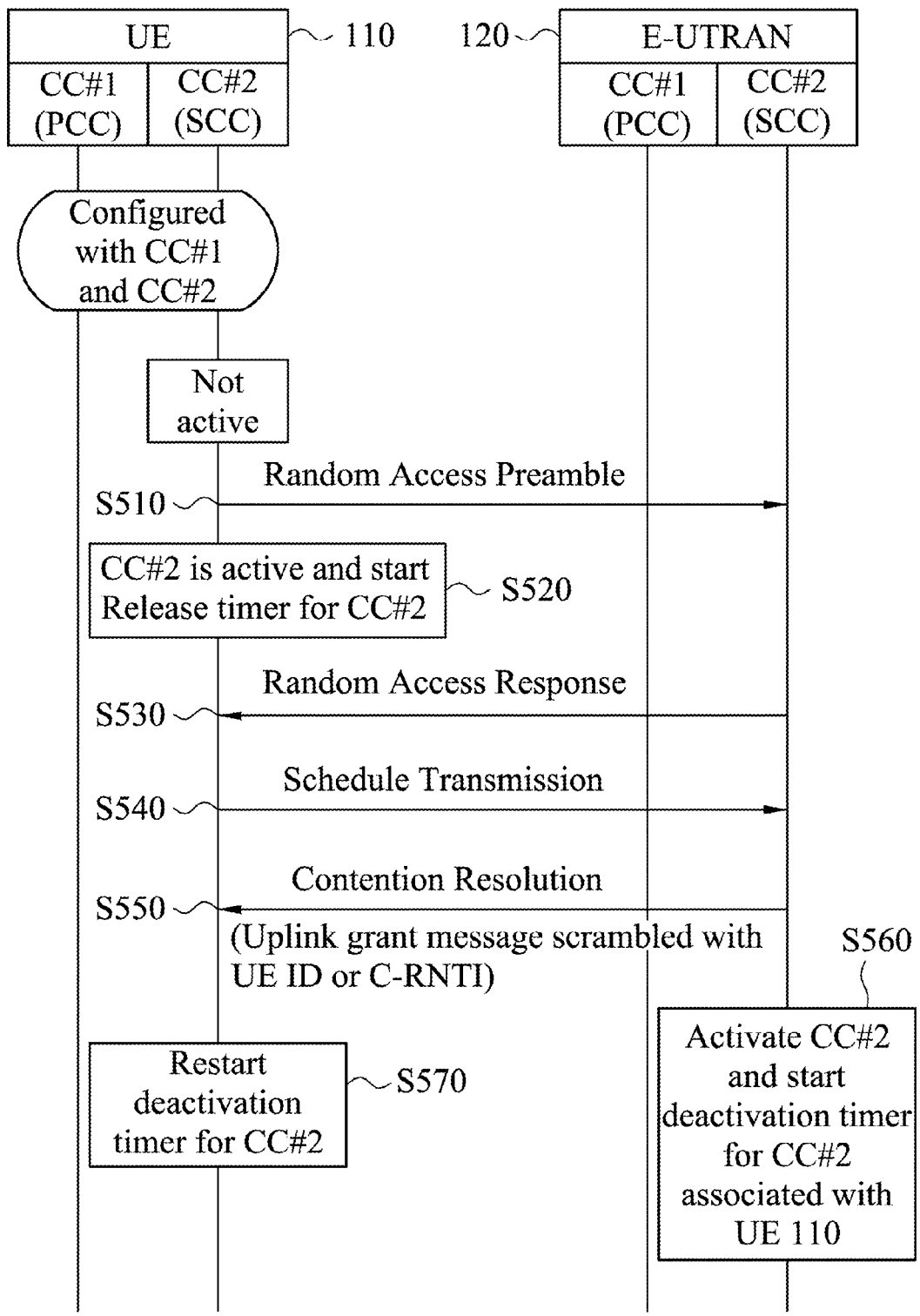
FIG. 5 is a message sequence chart illustrating a contention based random access procedure according to yet another embodiment of the invention.

FIG. 5 is a message sequence chart illustrating a contention based random access procedure according to yet another embodiment of the invention. Similar to FIG. 3, the radio access network 120 is an E-UTRAN and the wireless communications device 110 is a UE. Initially, CC#1 and CC#2 are already configured for the wireless communications device 110, wherein CC#1 is configured as a primary CC and CC#2 is configured as a secondary CC. Note that CC#1 is already active since it has been configured as a primary CC, while CC#2 is initially inactive. In order to activate CC#2, the wireless communications device 110 transmits an RAP message to the radio access network 120 on CC#2 (step S510), wherein the RAP message is transmitted using a preamble selected from a preamble pool broadcasted by the radio access network 120. Note that, upon transmission of the RAP message, the wireless communications device 110 may consider CC#2 as being activated and start a deactivation timer for counting the activation time period for CC#2 (step S520). When receiving the RAP message, the radio access network 120 replies with, on CC#2, an RAR message to acknowledge the receipt of the RAP message to the wireless communications device 110 (step S530). However, since the preamble pool is known to all wireless communications devices in the coverage of the radio access network 120, there may be a situation where multiple wireless communications devices select the same preamble to transmit the RAP messages to the radio access network 120. Thus, the wireless communications device 110 further performs a scheduled transmission on CC#2 indicating its UE ID or C-RNTI to the radio access network 120 (step S540). When receiving the scheduled transmission from the wireless communications device 110, the radio access network 120 replies with, on CC#2, a contention resolution message to the wireless communications device 110 (step S550), wherein the contention resolution message is an uplink grant message transmitted via a control channel (e.g., the PDCCH in the LTE system or other control channels depending on the utilized RAT) and scrambled with the UE ID or C-RNTI of the wireless communications device 110. Note that, the radio access network 120 may assign uplink resource blocks on CC#2 via the uplink grant message, or may assign uplink resource blocks on other CCs via the uplink grant message with the corresponding CC indicators, so that the wireless communications device 110 may be able to transmit data or control signal in the uplink direction. In another embodiment, the contention resolution message may be an uplink grant message which contains the CC#2 indicator and is transmitted on any activated CC other than CC#2 via a control channel (e.g., the PDCCH in the LTE system or other control channels depending on the utilized RAT), and the uplink resource blocks on the corresponding CC is assigned to the wireless communications device 110 via this uplink grant message. Specifically, the uplink resource blocks on the corresponding CC may be indicated by a CC indicator, such as a CIF. Upon transmission of the uplink grant message, the radio access network 120 activates CC#2 and starts a deactivation timer for counting the activation time period for CC#2 (step S560). Next, when receiving the uplink grant message, the wireless communications device 110 restarts the deactivation timer for CC#2 according to the uplink grant message to synchronize the activation time period for CC#2 with the radio access network 120 (step S570). Specifically, the deactivation timer is restarted in response to the uplink grant message being successfully de-scrambled with the UE ID or C-RNTI, or the uplink grant message contains the CC#2 indicator of the wireless communications device 110. That is, it is determined that the contention resolution message received in step S550 is for the wireless communications device 110 if the wireless communications device 110 successfully de-scrambles the uplink grant message in the PDCCH using its UE ID or C-RNTI or successfully decodes the uplink grant message in the PDCCH with this CC indicator, and the contention based random access procedure is completed. In another embodiment, the wireless communications device 110 and the radio access network 120 may start or restart the deactivation timer for a predetermined time period, for the wireless communications device 110 to process the contention resolution message. Likewise, the radio access network 120 may postpone the start of the deactivation timer for the predetermined time period. Alternatively, the deactivation timer may not be started upon transmission of the RAP message and later be started, when the uplink grant message scrambled with the UE ID or C-RNTI or the uplink grant message containing the CC#2 indicator of the wireless communications device 110 is received.

Figure 6:
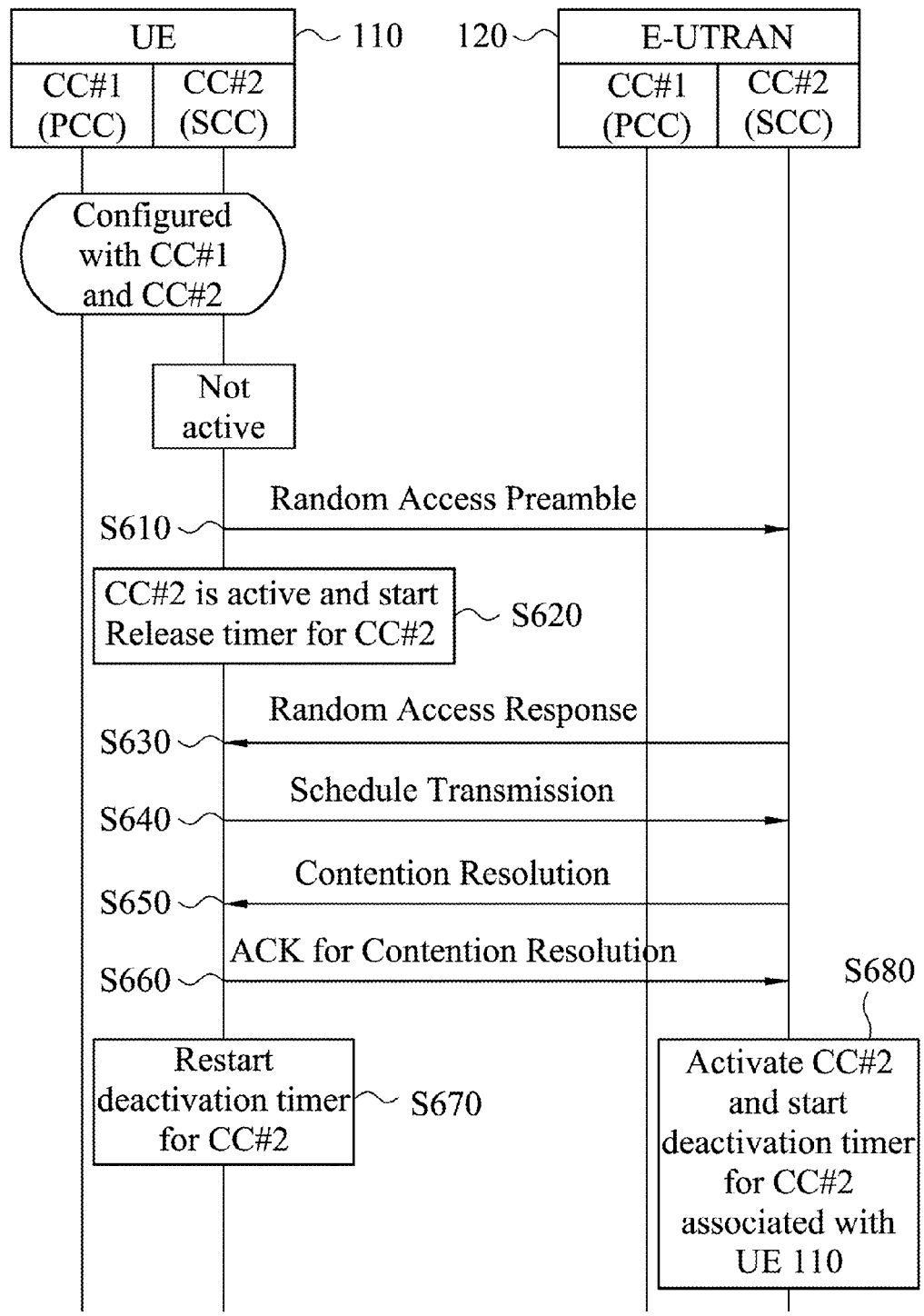
FIG. 6 is a message sequence chart illustrating a contention based random access procedure according to still another embodiment of the invention.

FIG. 6 is a message sequence chart illustrating a contention based random access procedure according to still another embodiment of the invention. Similar to FIG. 3, the radio access network 120 is an E-UTRAN and the wireless communications device 110 is a UE. Initially, CC#1 and CC#2 are already configured for the wireless communications device 110, wherein CC#1 is configured as a primary CC and CC#2 is configured as a secondary CC. Note that CC#1 is already active since it has been configured as a primary CC, while CC#2 is initially inactive. In order to activate CC#2, the wireless communications device 110 transmits an RAP message to the radio access network 120 on CC#2 (step S610), wherein the RAP message is transmitted using a preamble selected from a preamble pool broadcasted by the radio access network 120. Note that, upon transmission of the RAP message, the wireless communications device 110 may consider CC#2 as being activated and start a deactivation timer for counting the activation time period for CC#2 (step S620). When receiving the RAP message, the radio access network 120 replies with, on CC#2, an RAR message to acknowledge the receipt of the RAP message to the wireless communications device 110 (step S630). However, since the preamble pool is known to all wireless communications devices in the coverage of the radio access network 120, there may be a situation where multiple wireless communications devices select the same preamble to transmit the RAP messages to the radio access network 120. Thus, the wireless communications device 110 further performs a scheduled transmission on CC#2 indicating its UE ID or C-RNTI to the radio access network 120 (step S640). When receiving the scheduled transmission from the wireless communications device 110, the radio access network 120 replies with, on CC#2, a contention resolution message to the wireless communications device 110 (step S650), wherein the contention resolution message is a MAC CE containing the UE ID or C-RNTI of the wireless communications device 110. In another embodiment, the contention resolution message may be transmitted on any other CC that has already been activated. When receiving the contention resolution message, the wireless communications device 110 determines that the contention resolution message is a MAC CE containing its UE ID or C-RNTI, which means that the RAR message received in step S630 is for the wireless communications device 110. Subsequently, the wireless communications device 110 transmits an acknowledgement message to the radio access network 120 on CC#2 to acknowledge the reception of the contention resolution message (step S660). Alternatively, the acknowledgement message may be transmitted on any other CC that has already been activated. Upon transmission of the acknowledgement message, the wireless communications device 110 restarts the deactivation timer for CC#2 (step S670). Meanwhile, the radio access network 120 activates CC#2 and starts a deactivation timer for counting the activation time period for CC#2 in response to receiving the acknowledgement message (step S680). Since both of the wireless communications device 110 and the radio access network 120 starts/restarts the deactivation timer for CC#2 in response to the acknowledgement message, the activation time period for CC#2 may be synchronized accordingly. In another embodiment, the wireless communications device 110 and the radio access network 120 may start or restart the deactivation timer for a predetermined time period, for the wireless communications device 110 to process the contention resolution message.

Figure 7:
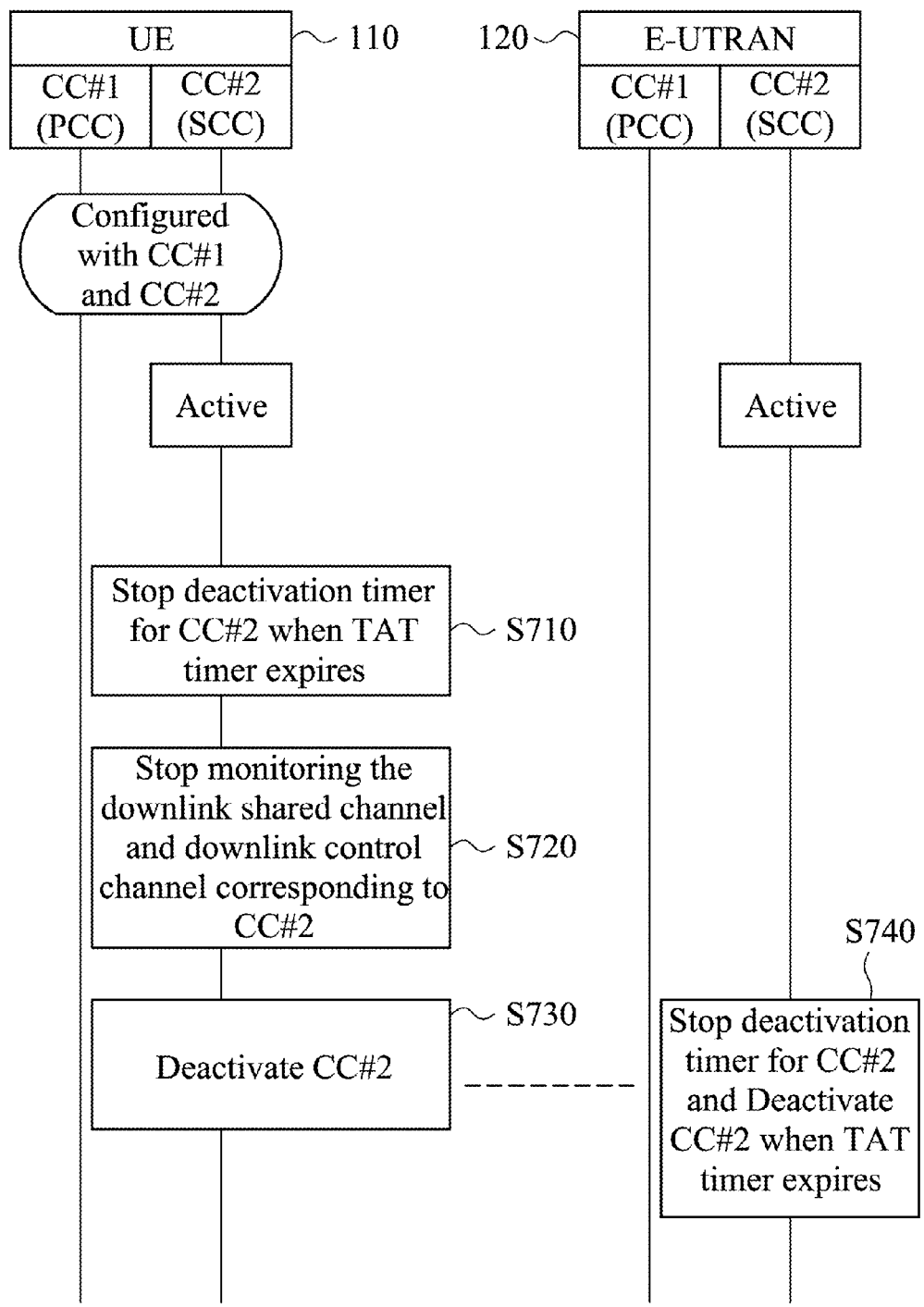
FIG. 7 is a message sequence chart illustrating deactivation of a secondary CC according to an embodiment of the invention.

In addition to the activation of the secondary CC(s) as described above with respect to FIGS. 2~6, the invention also provides a way for deactivating the secondary CC(s). FIG. 7 is a message sequence chart illustrating deactivation of a secondary CC according to an embodiment of the invention. Note that CC#1 is already active since it has been configured as a primary CC, and CC#2 is active by either one of the non-contention based random access procedure as described in FIG. 2 and the contention based random access procedure as described in FIGS. 3~6. Initially, a Time Alignment Timer (TAT) is started for CC#2 in the wireless communications device 110 due to receiving an RAR message from the radio access network 120 during the contention or non-contention based random access procedure as described above in FIGS. 2~6. Correspondingly, a TAT is also started for CC#2 in the radio access network 120 due to transmission of the RAR message. The TAT is a timer used to define a predetermined time period when the wireless communications device 110 may stay uplink-timing aligned with the radio access network 120 on a specific CC. Before the TAT expires, the wireless communications device 110 may monitor downlink control channel (e.g., the PDCCH in the LTE system or other control channels depending on the utilized RAT) and downlink shared channel (e.g., the PDSCH in the LTE system or other shared channels depending on the utilized RAT) to receive downlink control messages or uplink grant message and downlink data on the corresponding CC, and then transmit acknowledgement messages to the radio access network 120 on the corresponding CC for acknowledging the downlink control message or uplink grant message and downlink data received via the downlink control channel and the downlink shared channel, respectively. In another embodiment, the TAT may be started due to receiving a Timing Advance Command (TAC) from the radio access network 120. Later, when the TAT for CC#2 expires, the wireless communications device 110 stops the deactivation timer for CC#2 (step S710). Subsequently, the wireless communications device 110 stops monitoring the downlink control channel and the downlink shared channel corresponding to CC#2 (step S720). Lastly, the wireless communications device 110 deactivates CC#2 (step S730). Likewise, the radio access network 120 deactivates CC#2 and stops the deactivation timer for CC#2 in response to the expiration of the TAT for CC#2 (step S740), and the deactivation of CC#2 is completed.

Figure 8:
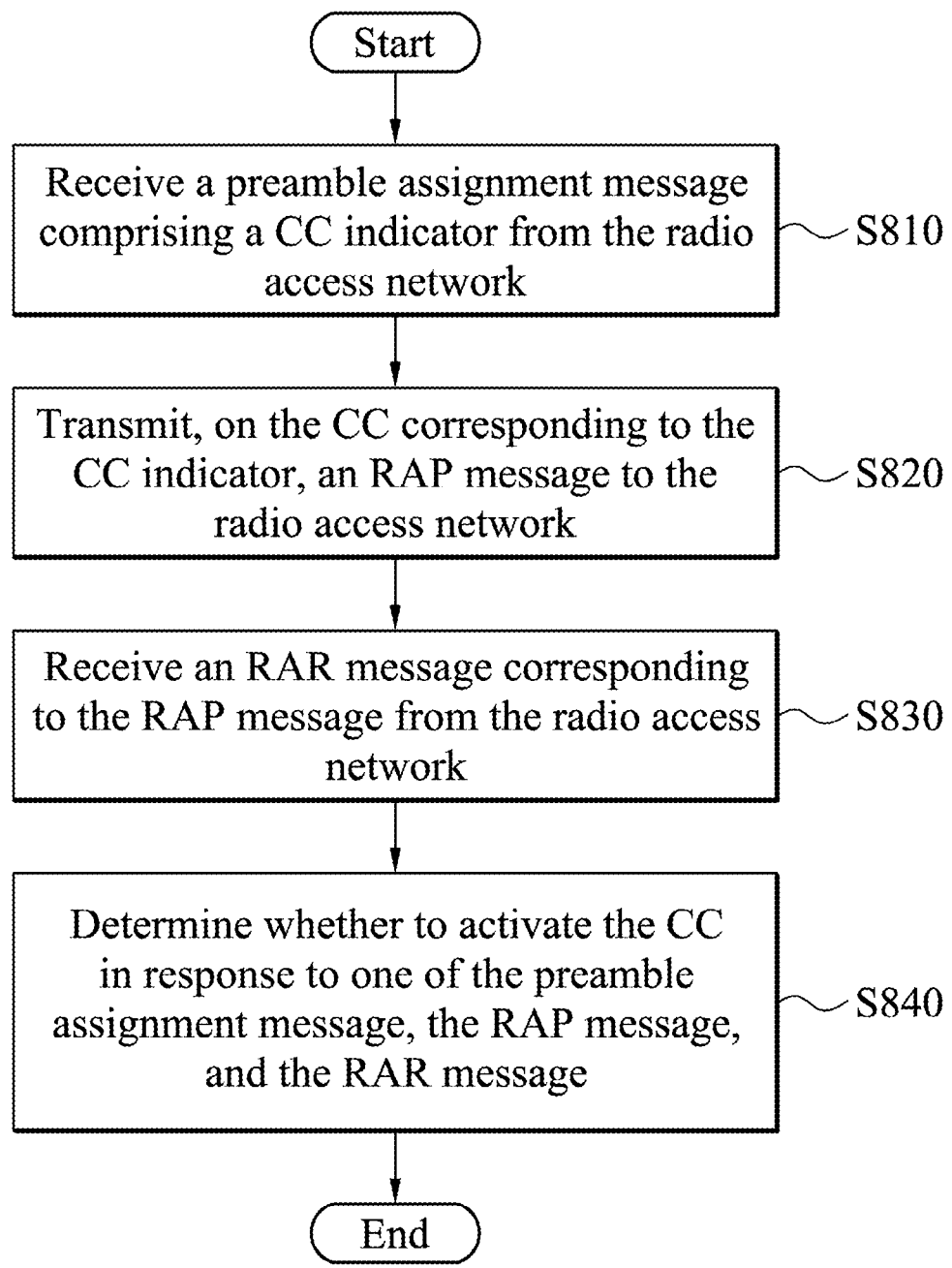
FIG. 8 is a flow chart illustrating a non-contention based method for managing multiple CCs in a wireless communications device according to an embodiment of the invention.

FIG. 8 is a flow chart illustrating a non-contention based method for managing multiple CCs in a wireless communications device according to an embodiment of the invention. The non-contention based method for managing multiple CCs may be applied for activating configured but inactive CC(s). The wireless communications device is wirelessly connected to a radio access network for obtaining wireless services. Initially, there may be a primary CC configured for the wireless communications device, which is already active. To begin the non-contention based method for managing multiple CCs, the wireless communications device receives a preamble assignment message comprising a CC indicator from the radio access network (step S810), wherein the CC indicator indicates a specific CC. In one embodiment, the CC indicator may be implemented by a CIF. Note that the preamble assignment message may be received on any CC that has already been activated. For example, in one embodiment, if only CC#1 is activated, the preamble assignment message may be received on CC#1. Next, the wireless communications device transmits, on the CC corresponding to the CC indicator, an RAP message to the radio access network (step S820), and receives an RAR message corresponding to the RAP message from the radio access network (step S830). The RAR message may be received on the CC corresponding to the CC indicator, or on any other CC that has already been activated. Subsequently, the wireless communications device determines whether to activate the CC in response to one of the preamble assignment message, the RAP message, and the RAR message (step S840). To be more specific about step S840, in one embodiment, the wireless communications device may consider the CC as being activated when the preamble assignment message is received, while in another embodiment, the CC may be considered as being activated when the RAP message is transmitted. Yet in another embodiment, the wireless communications device may consider the CC as being activated when the RAR message is received, or after a predetermined time period subsequent to the time when the RAR message is received. As the CC is considered activated, the wireless communications device may receive data and the control signal on the CC via the downlink shared channel (e.g., the PDSCH in the LTE system or other shared channels depending on the utilized RAT) and the downlink control channel (e.g., the PDCCH in the LTE system or other control channels depending on the utilized RAT), respectively, and may perform CQI measurements. In addition, the wireless communications device may start a deactivation timer for counting a predetermined time period when the CC is activated, wherein the predetermined time period specifies the time when the CC may stay activated. That is, the CC is considered deactivated when the deactivation timer expires. Note that, if the RAR message is not received on the CC corresponding to the CC indicator, ambiguity may be caused in the RAR message, as described above with respect to FIG. 2. Thus, the wireless communications device may determine whether the RAR message is scrambled with its UE ID or C-RNTI, when receiving the RAR message, and the wireless communications device may only activate the CC if the RAR message is scrambled with its UE ID or C-RNTI.

Figure 9:
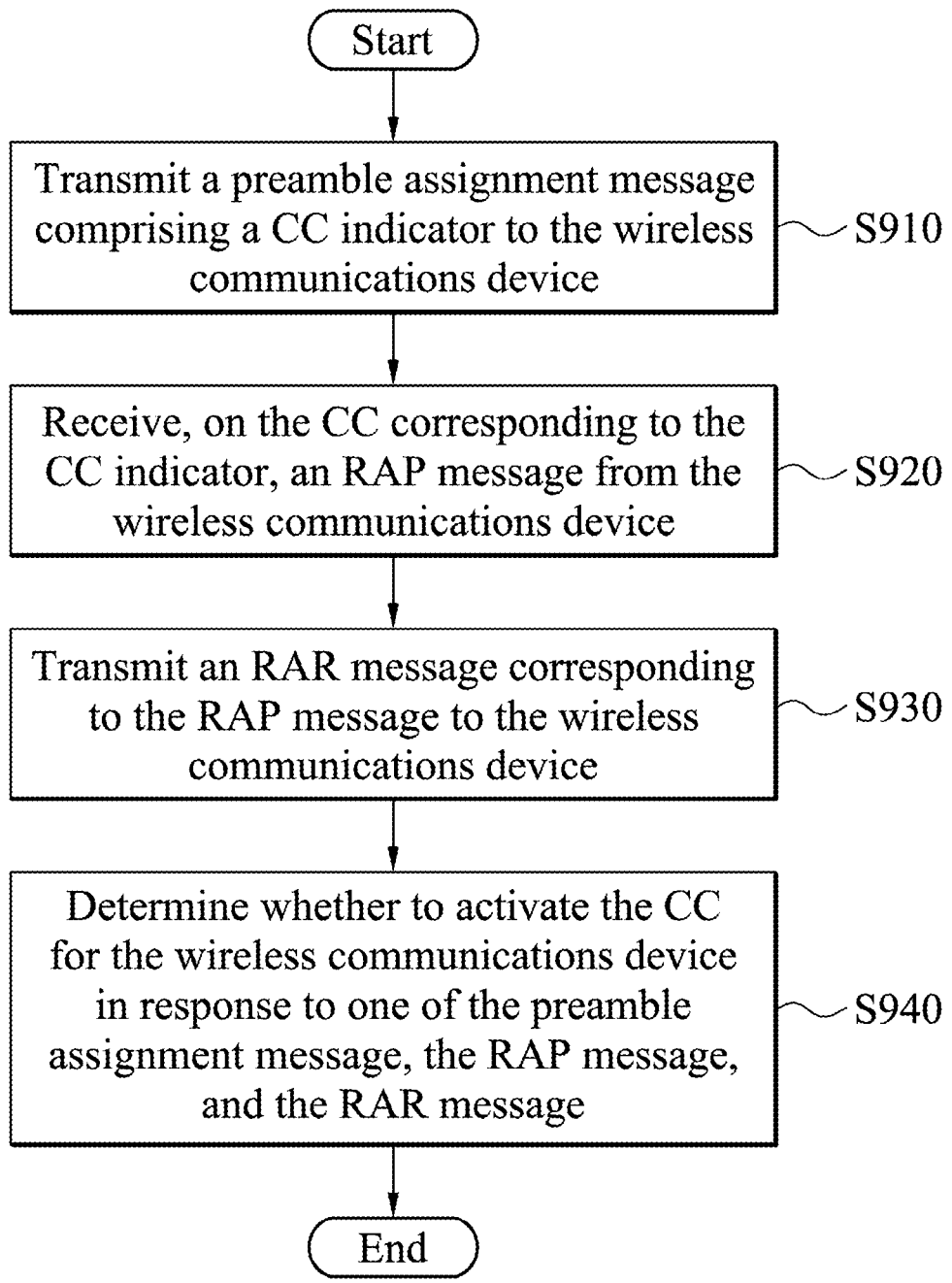
FIG. 9 is a flow chart illustrating a non-contention based method for managing multiple CCs by a radio access network according to an embodiment of the invention.

FIG. 9 is a flow chart illustrating a non-contention based method for managing multiple CCs by a radio access network according to an embodiment of the invention. The non-contention based method for managing multiple CCs may be applied for activating configured but inactive CC(s). The radio access network provides wireless services for a wireless communications device wirelessly connected thereto. Similar to FIG. 8, there may be a primary CC configured for the wireless communications device, which is already active. To begin the non-contention based method for managing multiple CCs, the radio access network first transmits a preamble assignment message comprising a CC indicator to the wireless communications device (step S910), wherein the CC indicator indicates a specific CC. In one embodiment, the CC indicator may be implemented by a CIF. Note that the preamble assignment message may be transmitted on any CC that has already been activated for the wireless communications device. For example, in one embodiment, if only CC#1 is activated, the preamble assignment message may be transmitted on CC#1 to the wireless communications device. Later, the radio access network receives, on the CC corresponding to the CC indicator, an RAP message from the wireless communications device (step S920), and transmits an RAR message corresponding to the RAP message to the wireless communications device (step S930). Specifically, the RAR message may be transmitted on the CC corresponding to the CC indicator, or on any other CC that has already been activated for the wireless communications device. Next, the radio access network determines whether to activate the CC for the wireless communications device in response to one of the preamble assignment message, the RAP message, and the RAR message (step S940). To be more specific about step S940, in one embodiment, the radio access network may activate the CC when the preamble assignment message is transmitted, while in another embodiment, the CC may be activated when the RAP message is received. Yet in another embodiment, the radio access network may activate the CC when the RAR message is transmitted, or after a predetermined time period subsequent to the time when the RAR message is transmitted. As the CC is activated, the radio access network may start transmitting data and the control signal on the CC via the downlink shared channel (e.g., the PDSCH in the LTE system, or other shared channels depending on the utilized RAT) and the downlink control channel (e.g., the PDCCH in the LTE system, or other control channels depending on the utilized RAT), respectively, and may request the wireless communications device to perform CQI measurements. In addition, the radio access network may start a deactivation timer for counting a predetermined time period when the CC is activated, wherein the predetermined time period specifies the time when the CC may stay activated. That is, the CC is deactivated when the deactivation timer expires. Note that, if the RAR message is not transmitted on the CC corresponding to the CC indicator, ambiguity may be caused in the RAR message, as described above with respect to FIG. 2. Thus, the radio access network may scramble the RAR message with the UE ID or C-RNTI of the wireless communications device, so that the wireless communications device may determine whether the RAR message is corresponding to the RAP message by de-scrambling the RAR message with its UE ID or C-RNTI. The wireless communications device may only activate the CC if the de-scrambling of the RAR message is successful. In another embodiment for solving the ambiguity problem, the radio access network may not assign the same preamble which is assigned to the wireless communications device to another wireless communications device when the wireless communications device and the another wireless communications device have the same at least one configured and/or activated CC, so that the preamble may be used to uniquely identify which wireless communications device the RAP message and the RAR message are for.

Figure 10:
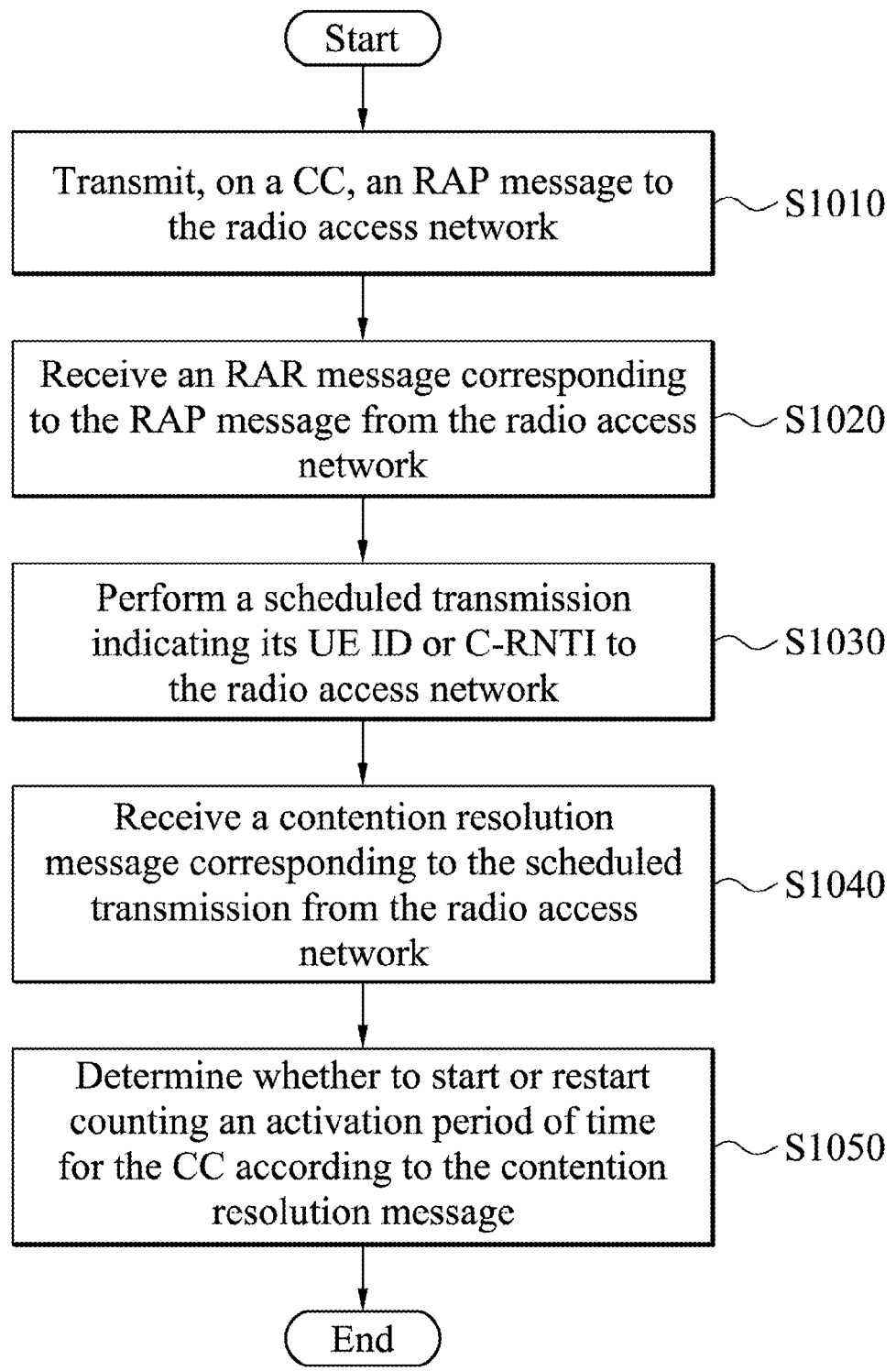
FIG. 10 is a flow chart illustrating a contention based method for managing multiple CCs in a wireless communications device according to an embodiment of the invention.

FIG. 10 is a flow chart illustrating a contention based method for managing multiple CCs in a wireless communications device according to an embodiment of the invention. The contention based method for managing multiple CCs may be applied for activating configured but inactive CC(s). The wireless communications device is wirelessly connected to a radio access network for obtaining wireless services. Initially, there may be a primary CC configured for the wireless communications device, which is already active. To begin the contention based method for managing multiple CCs, the wireless communications device first transmits, on a CC, an RAP message to the radio access network (step S1010), wherein the RAP message is transmitted using a preamble selected from a preamble pool broadcasted by the radio access network. Subsequently, the wireless communications device receives an RAR message corresponding to the RAP message from the radio access network (step S1020). In order to further clarify whether the RAR message corresponds to the RAP message, the wireless communications device performs a scheduled transmission indicating its UE ID or C-RNTI to the radio access network (step S1030). Later, the wireless communications device receives a contention resolution message corresponding to the scheduled transmission from the radio access network (step S1040), and then determines whether to start or restart counting an activation time period for the CC according to the contention resolution message (step S1050). Note that, the contention resolution message may be carried out with several embodiments. In a first embodiment, the contention resolution message may be a MAC CE comprising the UE ID or C-RNTI of the wireless communications device, and the determination of whether to start or restart counting the activation time period may be performed in response to the MAC CE comprising the UE ID or C-RNTI. In a second embodiment, the contention resolution message may be downlink control message which is transmitted via the control channel (e.g., the PDCCH in the LTE system or others depending on the utilized RAT) and is scrambled with the UE ID or C-RNTI of the wireless communications device, and the wireless communications device further de-scrambles the downlink control message using its UE ID or C-RNTI; or the contention message may be a downlink control message which is transmitted on any other active CC and contains a CC indicator corresponding to the inactive CC to be activated. The determination of whether to start or restart counting the activation time period may be performed in response to the success of de-scrambling the downlink control message or the downlink control message containing a CC indicator corresponding to the inactive CC to be activated. In a third embodiment, the contention resolution message may be an uplink grant message which is transmitted on this CC via the downlink control channel (e.g., the PDCCH in the LTE system, or other control channels depending on the utilized RAT) and is scrambled with the UE ID or C-RNTI of the wireless communications device, and the wireless communications device further de-scrambles the uplink grant message using its UE ID or C-RNTI; or the contention resolution message may be an uplink grant message which is transmitted on any other active CC and contains a CC indicator corresponding to the inactive CC to be activated. The determination of whether to start or restart counting the activation time period may be performed in response to the success of de-scrambling the uplink grant message or the uplink grant message containing a CC indicator corresponding to the inactive CC to be activated.

In another embodiment, the contention resolution message may be a MAC CE comprising the UE ID or C-RNTI of the wireless communications device, but the determination step of whether to start or restart counting the activation time period may be delayed until a downlink control message or an uplink grant message scrambled with the UE ID or C-RNTI is received from the radio access network via the control channel (e.g., the PDCCH in the LTE system, or other control channels depending on the utilized RAT). Specifically, the wireless communications device may de-scramble the downlink control message or uplink grant message using its UE ID or C-RNTI, and only starts or restarts counting the activation time period if the de-scrambling process is successful. In yet another embodiment, after receiving the contention resolution message, the wireless communications device may further transmit an acknowledgement message to the radio access network for acknowledging the receipt of the contention resolution message. The acknowledgement message may be transmitted on the CC or on any other CC that has already been activated, and the determination step of whether to start or restart counting the activation time period may be performed in response to transmitting the acknowledgement message, instead of in response to receiving the contention resolution message.

Figure 11:
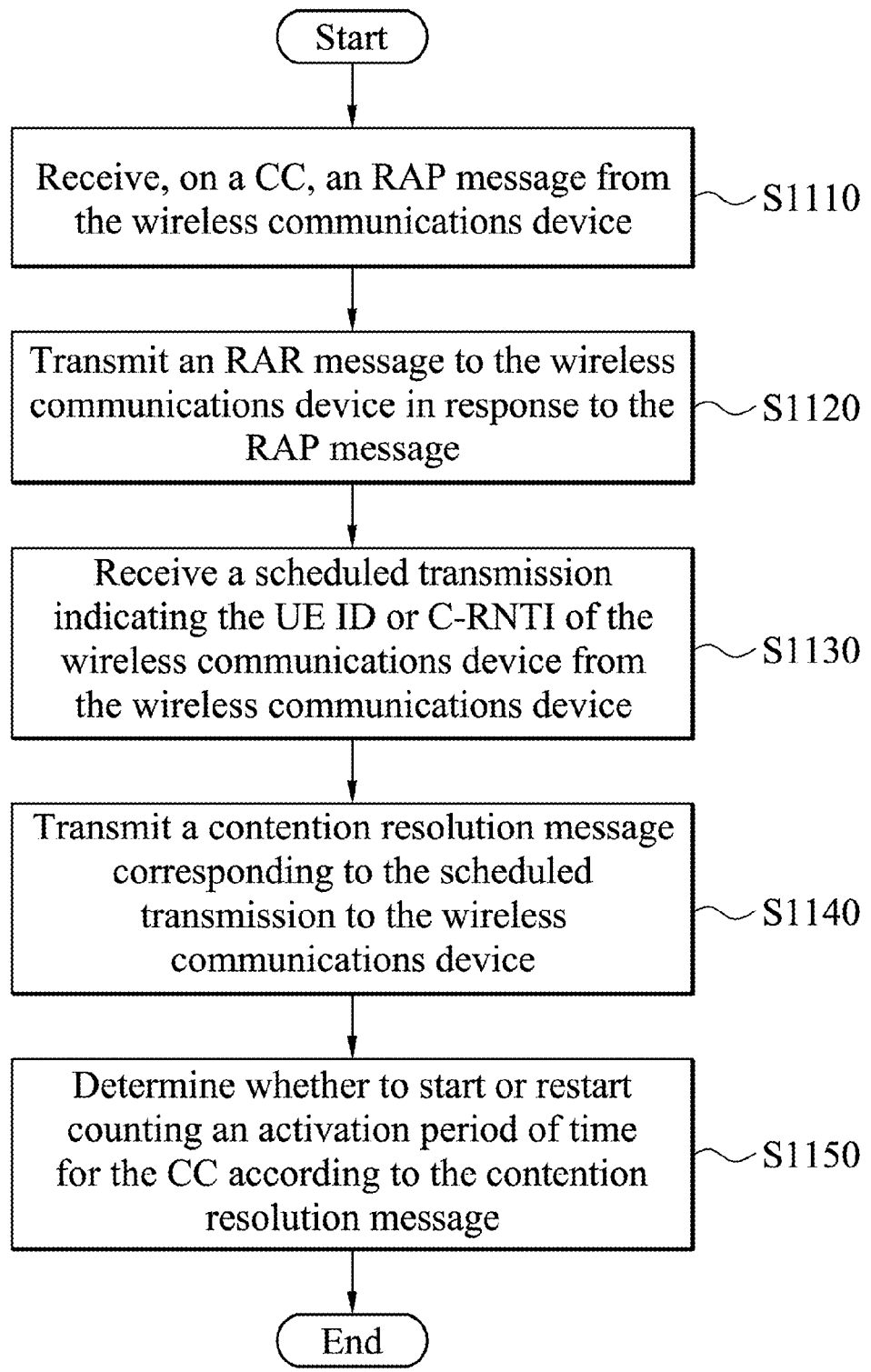
FIG. 11 is a flow chart illustrating a contention based method for managing multiple CCs by a radio access network according to an embodiment of the invention.

FIG. 11 is a flow chart illustrating a contention based method for managing multiple CCs by a radio access network according to an embodiment of the invention. The contention based method for managing multiple CCs may be applied for activating configured but inactive CC(s). The radio access network provides wireless services for a wireless communications device wirelessly connected thereto. Similar to FIG. 10, there may be a primary CC configured for the wireless communications device, which is already active. To begin the contention based method for managing multiple CCs, the radio access network first receives, on a CC, an RAP message from the wireless communications device (step S1110). Subsequently, the radio access network transmits an RAR message to the wireless communications device in response to the RAP message (step S1120). Later, the radio access network receives a scheduled transmission indicating the UE ID or C-RNTI of the wireless communications device from the wireless communications device (step S1130), wherein the scheduled transmission is performed by the wireless communications device to clarify whether the RAR message corresponds to the RAP message. When receiving the scheduled transmission, the radio access network transmits a contention resolution message corresponding to the scheduled transmission to the wireless communications device (step S1140), and then determines whether to start or restart counting an activation time period for the CC according to the contention resolution message (step S1150). Note that, the contention resolution message may be carried out with several embodiments. In a first embodiment, the contention resolution message may be a MAC CE comprising the UE ID or C-RNTI of the wireless communications device, and the determination of whether to start or restart counting the activation time period may be performed in response to the transmission of the MAC CE. In a second embodiment, the contention resolution message may be a downlink control message scrambled with the UE ID or C-RNTI of the wireless communications device. That is, the radio access network further scrambles the downlink control message using the UE ID or C-RNTI of the wireless communications device. The determination of whether to start or restart counting the activation time period may be performed in response to the transmission of the downlink control message. In a third embodiment, the contention resolution message may be an uplink grant message which is transmitted via the control channel (e.g., the PDCCH in the LTE system, or other control channels depending on the utilized RAT) and is scrambled with the UE ID or C-RNTI of the wireless communications device; or the contention message may be a downlink control message which is transmitted on any other active CC and contains a CC indicator corresponding to the inactive CC to be activated. That is, the radio access network further scrambles the uplink grant message using the UE ID or C-RNTI of the wireless communications device, or prepares the uplink grant message containing the CC indicator to be transmitted on any other active CC. The determination of whether to start or restart counting the activation time period may be performed in response to the transmission of the uplink grant message.

In another embodiment, the contention resolution message may be a MAC CE comprising the UE ID or C-RNTI of the wireless communications device, but the determination step of whether to start or restart counting the activation time period may be delayed until the radio access network further transmits a downlink control message or an uplink grant message scrambled with the UE ID or C-RNTI of the wireless communications device to the wireless communications device via the control channel (e.g., the PDCCH in the LTE system, or other control channels depending on the utilized RAT). Specifically, the radio access network may scramble the downlink control message or uplink grant message using the UE ID or C-RNTI the wireless communications device, and starts or restarts counting the activation time period if when the downlink data or the uplink grant message is transmitted, so that the wireless communications device de-scrambles the downlink control message or uplink grant message using its UE ID or C-RNTI. In yet another embodiment, after transmitting the contention resolution message, the radio access network may further receive an acknowledgement message from the wireless communications device for acknowledging the delivery of the contention resolution message. The acknowledgement message may be received on the CC or on any other CC that has already been activated, and the determination step of whether to start or restart counting the activation time period may be performed in response to receiving the acknowledgement message, instead of in response to transmitting the contention resolution message.

Figure 12:
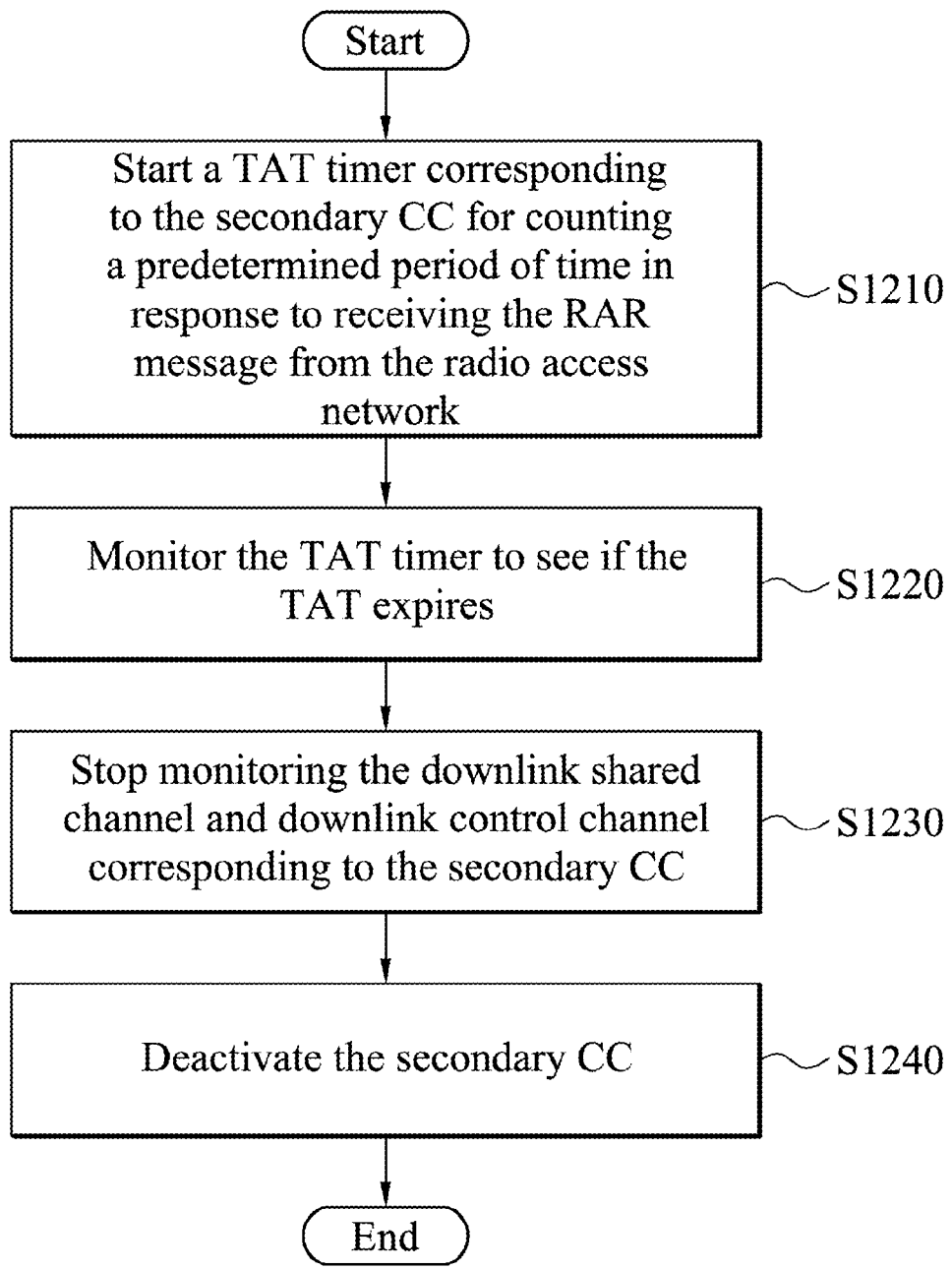
FIG. 12 is a flow chart illustrating a deactivation method for managing a secondary CC in a radio access network according to an embodiment of the invention.

FIG. 12 is a flow chart illustrating a deactivation method for managing a secondary CC in a radio access network according to an embodiment of the invention. The deactivation method for managing a secondary CC may be applied for controlling the activation time period for a secondary CC. The wireless communications device is wirelessly connected to a radio access network for obtaining wireless services. Initially, there may be a primary CC and a secondary CC configured for the wireless communications device, which are both active. Specifically, the activation of the secondary CC may be accomplished by the non-contention based random access procedure as described above with respect to FIG. 2, or by the contention based random access procedure as described above with respect to FIGS. 3-6. To begin the deactivation method for managing the secondary CC, the wireless communications device first starts a TAT timer corresponding to the secondary CC for counting a predetermined time period in response to receiving the RAR message from the radio access network (step S1210). In another embodiment, the wireless communications device may also start or restart the TAT timer in response to receiving a TAC message from the radio access network. Subsequently, the wireless communications device monitors the TAT timer to see if the TAT has expired (step S1220). If so, the wireless communications device stops monitoring the downlink shared channel (e.g., the PDSCH in the LTE system, or other shared channels depending on the utilized RAT) and the downlink control channel (e.g., the PDCCH in the LTE system, or other control channels depending on the utilized RAT) corresponding to the secondary CC (step S1230), and then deactivates the secondary CC (step S1240).

While the invention has been described by way of example and in terms of preferred embodiment, it is to be understood that the invention is not limited thereto. Those who are skilled in this technology can still make various alterations and modifications without departing from the scope and spirit of this invention. For example, the non-contention based and contention based random access procedures may also applied for wireless communications devices and radio access networks in compliance with the LTE—Advanced technology, or any evolutionary technology of the WCDMA/LTE technology family. Therefore, the scope of the invention shall be defined and protected by the following claims and their equivalents.

What is claimed is:

1. A wireless communications device for managing multiple component carriers by a non-contention based random access procedure, comprising:
   a wireless module, performing wireless transceiving to and from a radio access network; and
   a controller module, receiving a preamble assignment message comprising a component carrier indicator for a component carrier to be activated from the radio access network via the wireless module, transmitting, on the component carrier, a Random Access Preamble (RAP) message to the radio access network via the wireless module, receiving a Random Access Response (RAR) message corresponding to the RAP message from the radio access network via the wireless module, and determining whether to activate the component carrier in response to one of the preamble assignment message, the RAP message, and the RAR message,
   wherein the preamble assignment message, the RAP message, and the RAR message are received or transmitted during the non-contention based random access procedure,
   wherein the controller module further starts a first timer for counting a first predetermined time period in response to the RAR message or in response to receiving a Timing Advance Command (TAC) message from the radio access network via the wireless module, and deactivates the component carrier from any data transmission and reception in response to expiration of the first timer.

2. The wireless communications device of claim 1, wherein the preamble assignment message further indicates an assigned preamble, and the RAP message is transmitted using the assigned preamble.

3. The wireless communications device of claim 1, wherein the preamble assignment message is received on another component carrier that has already been activated.

4. The wireless communications device of claim 1, wherein the RAR message is received on the component carrier.

5. The wireless communications device of claim 1, wherein the RAR message is received on another component carrier that has already been activated.

6. The wireless communications device of claim 5, wherein the controller module further determines whether the RAR message is scrambled with a User Equipment Identification (UE ID) or Cell-Radio network Temporary Identifier (C-RNTI), and the determination of whether to activate the component carrier is performed in response to the RAR message being scrambled with the UE ID or C-RNTI.

7. The wireless communications device of claim 1, wherein the controller module further starts a second timer for counting a second predetermined time period in response to the component carrier being activated, and the component carrier stays activated until the second timer expires.

8. A method for managing multiple component carriers in a wireless communications device wirelessly connected to a radio access network by a non-contention based random access procedure, comprising:
   receiving a preamble assignment message comprising a component carrier indicator for a component carrier to be activated from the radio access network;
   transmitting, on the component carrier, a Random Access Preamble (RAP) message to the radio access network;
   receiving a Random Access Response (RAR) message corresponding to the RAP message from the radio access network;
   determining whether to activate the component carrier in response to one of the preamble assignment message, the RAP message, and the RAR message,
   wherein the preamble assignment message, the RAP message, and the RAR message are received or transmitted during the non-contention based random access procedure;
   starting a first timer for counting a first predetermined time period in response to the RAR message or in response to receiving a Timing Advance Command (TAC) message from the radio access network; and
   deactivating the component carrier from any data transmission and reception in response to expiration of the first timer.

9. The method of claim 8, wherein the preamble assignment message further indicates an assigned preamble, and the RAP message is transmitted using the assigned preamble.

10. The method of claim 8, wherein the preamble assignment message is received on another component carrier that has already been activated.

11. The method of claim 8, wherein the RAR message is received on the component carrier.

12. The method of claim 8, wherein the RAR message is received on another component carrier that has already been activated.

13. The method of claim 12, further comprising determining whether the RAR message is scrambled with a User Equipment Identification (UE ID) or Cell-Radio network Temporary Identifier (C-RNTI), wherein the determination of whether to activate the component carrier is performed in response to the RAR message being scrambled with the UE ID or C-RNTI.

14. The method of claim 8, further comprising starting a second timer for counting a second predetermined time period in response to the component carrier being activated, wherein the component carrier stays activated until the second timer expires.

15. A radio access network for managing multiple component carriers by a non-contention based random access procedure, comprising:
   an access node, performing wireless transceiving to and from a wireless communications device; and a control node, transmitting a preamble assignment message comprising a component carrier indicator for a component carrier to be activated to the wireless communications device via the access node, receiving, on the component carrier, a Random Access Preamble (RAP) message from the wireless communications device via the access node, transmitting a Random Access Response (RAR) message corresponding to the RAP message to the wireless communications device via the access node, and determining whether to activate the component carrier for the wireless communications device in response to one of the preamble assignment message, the RAP message, and the RAR message, wherein the preamble assignment message, the RAP message, and the RAR message are received or transmitted during the non-contention based random access procedure, wherein the control node further starts a first timer for counting a first predetermined time period in response to transmitting the RAR message or in response to transmitting a Timing Advance Command (TAC) message to the wireless communications device via the access node, and deactivates the component carrier from any data transmission and reception in response to expiration of the first timer.

16. The radio access network of claim 15, wherein the control node further indicates an assigned preamble in the preamble assignment message, and the RAP message is received with the assigned preamble.

17. The radio access network of claim 15, wherein the preamble assignment message is transmitted on another component carrier that has already been activated.

18. The radio access network of claim 15, wherein the RAR message is transmitted on the component carrier.

19. The radio access network of claim 15, wherein the RAR message is transmitted on another component carrier that has already been activated.

20. The radio access network of claim 19, wherein the control node further indicates an assigned preamble in the preamble assignment message, and reserves the assigned preamble only for the wireless communications device in response to multiple wireless communications devices configured with the another component carrier.

21. The radio access network of claim 19, wherein, prior to transmitting the RAR message, the control node further scrambles the RAR message with a User Equipment Identification (UE ID) or Cell-Radio network Temporary Identifier (C-RNTI) of the wireless communications device.

22. The radio access network of claim 15, wherein the control node further starts a second timer for counting a second predetermined time period in response to the component carrier being activated, and the component carrier stays activated until the second timer expires.

23. A method for managing multiple component carriers in a radio access network by a non-contention based random access procedure, comprising:

transmitting a preamble assignment message comprising a component carrier indicator for a component carrier to be activated to a wireless communications device;

receiving, on the component carrier, a Random Access Preamble (RAP) message from the wireless communications device;

transmitting a Random Access Response (RAR) message corresponding to the RAP message to the wireless communications device;

determining whether to activate the component carrier for the wireless communications device in response to one of the preamble assignment message, the RAP message, and the RAR message, wherein the preamble assignment message, the RAP message, and the RAR message are received or transmitted during the non-contention based random access procedure;

starting a first timer for counting a first predetermined time period in response to transmitting the RAR message or in response to transmitting a Timing Advance Command (TAC) message to the wireless communications device; and deactivating the component carrier from any data transmission and reception in response to expiration of the first timer.

24. The method of claim 23, further comprising indicating an assigned preamble in the preamble assignment message, wherein the RAP message is received with the assigned preamble.

25. The method of claim 23, wherein the preamble assignment message is transmitted on another component carrier that has already been activated.

26. The method of claim 23, wherein the RAR message is transmitted on the component carrier.

27. The method of claim 23, wherein the RAR message is transmitted on another component carrier that has already been activated.

28. The method of claim 27, further comprising indicating an assigned preamble in the preamble assignment message, and reserving the assigned preamble only for the wireless communications device in response to multiple wireless communications devices configured with the another component carrier.

29. The method of claim 27, further comprising scrambling the RAR message with a User Equipment Identification (UE ID) or Cell-Radio network Temporary Identifier (C-RNTI) of the wireless communications device, prior to transmitting the RAR message.

30. The method of claim 23, further comprising starting a second timer for counting a second predetermined time period in response to the component carrier being activated, wherein the component carrier stays activated until the second timer expires.

* * * * *